United States Patent
Paddock et al.

[11] Patent Number: 5,737,657
[45] Date of Patent: Apr. 7, 1998

[54] ADJUSTABLE PLATFORM HAVING A QUICK RELEASE MECHANISM FOR USE WITH A CAMERA

[76] Inventors: George K. Paddock; Christopher C. Haarhoff, both of 6040 Rodgerton Rd., Los Angeles, Calif. 90068

[21] Appl. No.: 560,399

[22] Filed: Nov. 17, 1995

[51] Int. Cl.⁶ .................................................. G03B 17/00
[52] U.S. Cl. .................... 396/428; 248/187.1; 348/373
[58] Field of Search ........................ 354/81, 82, 293; 248/177.1, 187.1; 396/419, 420, 425, 428; 348/373

[56] References Cited

U.S. PATENT DOCUMENTS

| | | | |
|---|---|---|---|
| 4,158,489 | 6/1979 | Gottschalk et al. | 352/243 |
| 4,398,815 | 8/1983 | Barzee et al. | 354/293 |
| 4,466,595 | 8/1984 | O'Connor | 248/558 |
| 4,570,887 | 2/1986 | Banister | 248/187 |
| 4,727,390 | 2/1988 | Brown | 354/82 |
| 4,929,973 | 5/1990 | Nakatani | 354/293 |
| 5,230,490 | 7/1993 | Sloop | 248/187 |
| 5,333,023 | 7/1994 | Oxford | 354/81 |
| 5,337,100 | 8/1994 | Oxford | 354/81 |
| 5,429,332 | 7/1995 | Ishikawa | 248/187 |

*Primary Examiner*—Russell E. Adams
*Assistant Examiner*—John Chizmar
*Attorney, Agent, or Firm*—W. Edward Johansen

[57] ABSTRACT

An adjustable platform is used with a camera support system which includes a camera support and a support apparatus. The adjustable platform includes a platform, a mounting plate, to which a camera is attached, and a quick release mechanism. The platform has a surface, a first downwardly innerly beveled sidewall and a second downwardly innerly beveled sidewall. The mounting plate is disposed on the platform. The first and second downwardly innerly beveled sidewalls loosely engage the mounting plate so that the mounting plate is slidably coupled to the platform. The quick release mechanism is coupled to the platform and, when the quick release mechanism engages the mounting plate, it secures the mounting plate to the platform. The adjustable platform includes a lateral adjustment mechanism and a longitudinal adjustment mechanism disposed beneath the platform and coupled thereto.

1 Claim, 3 Drawing Sheets

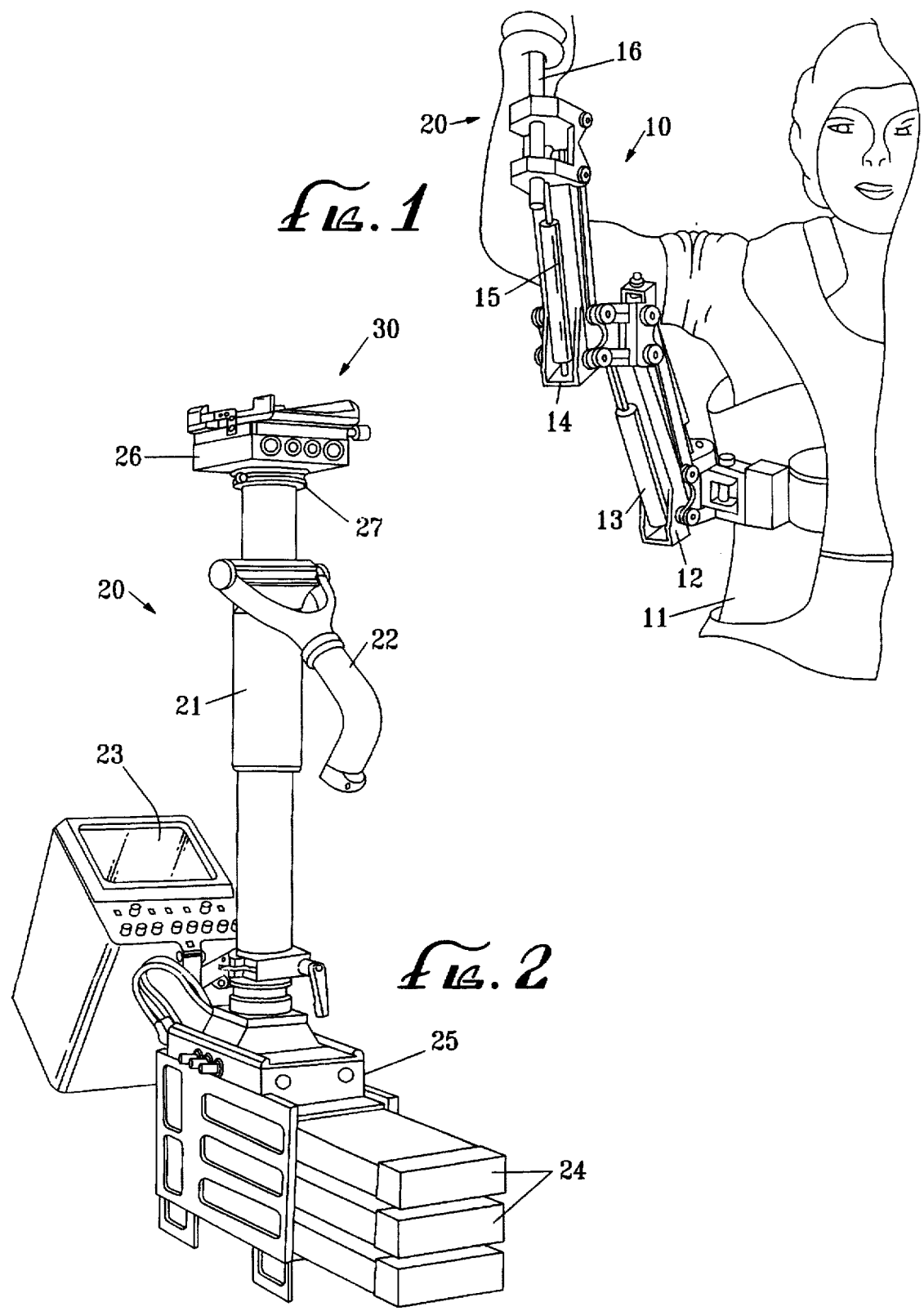

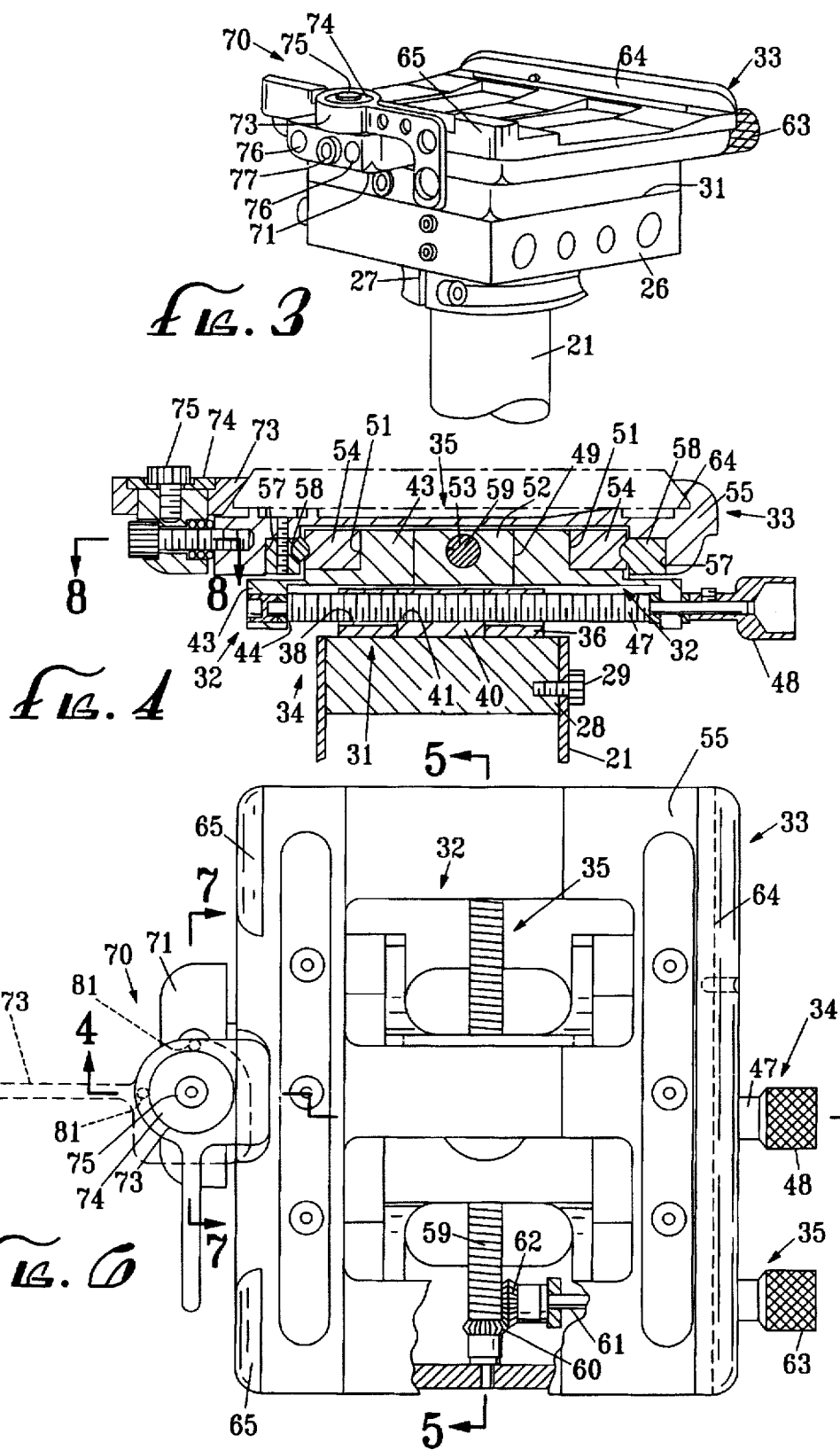

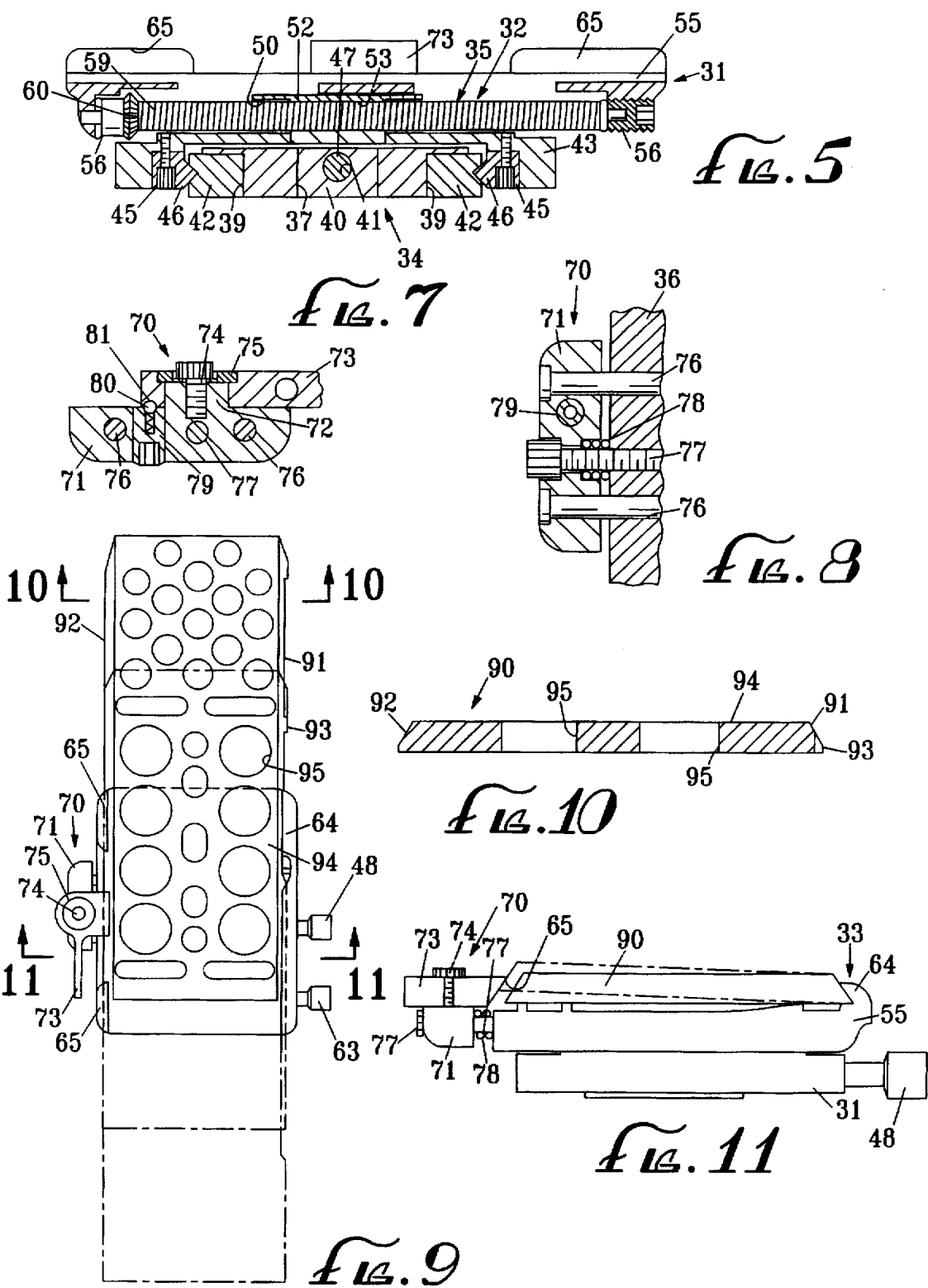

ADJUSTABLE PLATFORM HAVING A QUICK RELEASE MECHANISM FOR USE WITH A CAMERA

BACKGROUND OF THE INVENTION

The invention relates to an adjustable platform having a quick release mechanism for use with a camera.

U.S. Pat. No. 4,474,439 teaches a camera support system which includes a tube, a three-axis gimbal, a mounting plate and a plurality of auxiliary pieces of camera equipment. The tube is hollow and upright. The mounting plate can preferably be removably affixed to the tube in a secure, mechanical interconnection by a screw which is of suitable strength to releasably secure a camera to the mounting plate. The tube terminates upwardly in the mounting plate and terminates downwardly in either a permanently or removably affixed cap. The cap acts to prevent the components from inadvertantly slipping off of the tube while being positioned. The auxiliary pieces of camera equipment include a video monitor, a battery pack and an electronics package which is suitable for operation of the camera and the video monitor. The auxiliary pieces of camera equipment are preferably arranged in an annular configuration including a central bore of a size to overfit and slide upwardly upon the tube for securing thereto by employing one or more split ring clamps. The electronics package is adapted to be secured to the tube either above or below a bracket for the video monitor. The three-axis gimbal is a sliding fit upon the tube and can be provided with either a set screw or an adjustable split ring clamp fastener to releaseably affix the three-axis gimbal to the tube in a preferred location below the mounting plate and slightly above the center of gravity of the camera support system. The three-axis gimbal includes a link for connection to the mounting post. The mounting post is similar to the support arm and post in U.S. Pat. No. 4,208,028. One additional "floating" clamp can be positioned around the tube between a boss on the lower ring of the bracket for video moninitor and the upper boss of the electronics package.

The camera is mounted onto the mounting plate so that its center of gravity is directly over the body. This can be determined by holding the mounting plate with both hands, one on either side of the body and sliding the camera fore and aft until the camera support hangs level. Then lock the position of the camera with the conventional locking arrangements provided. Next tilt the camera support and the camera forward ninety degrees and hold it entirely by the gimbal or balance the gimbal ring on a pivot. The gimbal ring has previously been loosened just enough so it can be moved back and forth along the body until the gimbal is directly over the center of gravity of the camera support. Therefore the camera support hangs in "neutral balance." If the camera is nearly centered side to side on the mounting plate, any remaining slight deviation in side-to-side balance can be compensated for by slightly loosening the split ring clamps and rotating the electronics package and the attached battery side to side until the support hangs upright in the three-axis gimbal. Any adjustment which puts the system out of balance, such as moving the monitor to one side, can be compensated by the counter-adjustment of the appropriate other component. In making a picture with a camera it is extremely important that the camera be maintained in as stable a position as possible in order to obtain high quality results. Such stability has been achieved by mounting the camera on a tripod which supports the camera on a stationary support so as to eliminate any possibility of undesirable camera motion.

U.S. Pat. No. 4,394,075 teaches a support apparatus which includes a support vest, a first rotatably interconnected arm having a first end and a second end, a second rotatably interconnected arm having a first end and a second end, a first spring mechanism and a second spring mechanism. The first end of the first rotatably interconnected arm is rotatably and pivotably coupled to the support vest worn by an operator. The first end of the second rotatably interconnected arm is rotatably and pivotably coupled to the second end of the first rotatably interconnected arm. The second end of the second rotatably interconnected arm is arranged and configured to support the portable camera. The first and second spring mechanisms are coupled to the first and second rotatably interconnected arms, respectively, in order to compensate for the weight to each end of the rotatably interconnected arms. In operation a weight mounted on the support apparatus is spatially decoupled from the operator. The position of the weight is not affected by motion of the operator.

U.S. Pat. No. 4,017,168 teaches a camera support system which enables a mobile photographer to take high quality, ambulatory hand-held photographs with a motion picture camera. The camera support system includes a support apparatus and a camera support. The camera support has the mass of the camera support and the camera distributed at points which are remote from each other about a handle in a manner so that the handle is located at approximately the center of the moment of inertia of the combined sled and portable camera. Employment of the camera support increases inherent stability in a manner which permits a cameraman to obtain high quality results when utilizing hand-held equipment. The support apparatus permits the camera support to float freely in a manner to isolate the camera from any movement of the cameraman.

U.S. Pat. No. 4,017,168 and U.S. Pat. No. 4,208,028 teach the type of camera stabilizing systems which are currently available. One popular camera stabilizing system licensed under U.S. Pat. No. 4,017,168 is currently being sold by Cinema Products Corporation, Los Angeles, Calif., under the trademark "STEADICAM." The support arm constructions of these patents are herein incorporated by reference. Another system, also licensed under U.S. Pat. No. 4,017,168 is called "PANAGLIDE" and is available for rent from Panavision, Inc. of Tarzana, Calif. While these systems have been extensively employed, and have generally achieved the desired purpose of greatly improving the quality of hand-held cinematography, the configuration and construction of the camera equipment support elements of these presently available types have not proved equal to the continuous advance in the versatility of the art and the technical skill of the best operators now using the equipment.

Camera supports and camera stabilizing systems have increased in popularity and utilization over the past several years. Such systems have become an accepted additional tool to provide a higher quality of results than previously possible with hand-held cameras when site limitations render the use of a conventionally dolly mounted camera too expensive, restrictive or time consuming.

Operators are now routinely called upon to do a great deal more than the relatively straightforward running and stair-climbing shots of five years ago. A recent scene designed for the "STEADICAM" system, for instance, required the operator to cross a yard, climb porch stairs, and enter a house ahead of an actor and actress, get behind them as they have an elaborate argument while moving rapidly through a dining room and kitchen, precede them into the living room, climb upon a hidden elevator which lifts the operator up through a hole in the ceiling to the second floor as they climb the stairs, follow them at high speed into their bedroom and narrow bathroom, precede them back out the hall, jump on the elevator for the ride down as they descend the stairs, circle them twice as they embrace in the living room, back slowly out the door, down the steps, across the walk, step onto a crane and ride slowly up and back for a steady one minute hold for end titles. This type of shot can perhaps be accomplished with some difficulty by a skilled operator using the presently available equipment, but certainly would have been considered impossible just a few years ago. In order to obtain such shots, compromises must sometimes be made because of the limitations of the present equipment. Since the heaviest 35 mm silent cameras which are now routinely employed weigh as much as forty pounds with a super-speed lens, a lighter construction of the camera support itself would ease the operator's burden and allow him greater endurance.

U.S. Pat. No. 5,098,182 teaches a stabilized support which is both small and light-weight in construction. The stabilized and receives the equipment with which it is used upon an expanded support network. The expanded support network either deploys or positions the supported equipment in a manner which alters the position of its center of gravity so that the resulting unit can be effectively supported at its center of gravity.

The equipment support includes a platform for receiving the camera. The platform is counterbalanced by a view finding device and a battery or batteries for operating the equipment. The platform further preferably incorporates an adjustment mechanism which is an "x-y" table and which permits relative adjustment of the camera receiving platform to achieve an appropriate balance of the resulting unit. This adjustment mechanism includes a fitting for receiving the handle which supports the platform at a position which intersects with the center of gravity of the equipment and the supporting system which receives it, to achieve an appropriate static balance of the resulting unit about each of three perpendicular axes.

SUMMARY OF INVENTION

The present invention is generally directed to an adjustable platform for use in a camera support system which includes a camera support and a support apparatus. The camera support includes a tube, a three-axis gimbal, a video monitor, a battery pack, an electronics package and a junction box, a clamp ring and a mounting plate. A camera is attached to the mounting plate.

In a first separate aspect of the present invention, the adjustable platform includes a platform and a quick release mechanism. The platform has a surface, a first downwardly innerly beveled sidewall and a second downwardly innerly beveled sidewall. The mounting plate is disposed on the platform. The first and second downwardly innerly beveled sidewalls loosely engage the mounting plate so that the mounting plate is slidably coupled to the platform. The quick release mechanism is coupled to the platform and, when the quick release mechanism engages the mounting plate, it secures the mounting plate to the platform.

In a second separate aspect of the present invention, the quick release mechanism has a locking screw. The quick release mechanism, when it is open, allows the mounting plate to be mounted to the adjustable platform. When the locking screw is loosened, the quick release mechanism slidably secures the mounting plate to the adjustable platform. When the locking screw is tightened, the quick release mechanism secures the mounting plate to the adjustable platform.

In a third separate aspect of the present invention, the adjustable platform includes a lateral adjustment mechanism disposed beneath the platform and coupled thereto.

In a fourth separate aspect of the present invention, the adjustable platform includes a longitudinal adjustment mechanism disposed beneath the platform and coupled thereto.

Other aspects and many of the attendant advantages will be more readily appreciated as the same becomes better understood by reference to the following detailed description and considered in connection with the accompanying drawing in which like reference symbols designate like parts throughout the figures. The features of the present invention which are believed to be novel are set forth with particularity in the appended claims.

BRIEF DESCRIPTION OF THE DRAWING

FIG. 1 is a perspective drawing of a support apparatus including a support vest, a first arm, a second arm and a post according to U.S. Pat. No. 4,394,075.

FIG. 2 is a perspective drawing of a camera support which includes a tube, a three axis gimbal, a video monitor, a battery pack, an electronics package, a junction box, clamp ring and an adjustable platform according to the invention.

FIG. 3 is a perspective drawing of the tube, the junction box, the adjustable platform, which includes a first stage, a second stage, a third stage, a longitudinal adjustment mechanism, a lateral adjustment mechanism and a quick release mechanism, of FIG. 2.

FIG. 4 is a top plan view of the adjustable platform of FIG. 2.

FIG. 5 is a transverse cross-sectional view of the adjustable platform of FIG. 2 taken along the line 5—5 of FIG. 4.

FIG. 6 is a longitudinal cross-sectional view of the adjustable platform of FIG. 2 taken along the line 6—6 of FIG. 4.

FIG. 7 is an enlarged partial side elevational view in cross-section of the quick release mechanism of FIG. 2 taken along the line 7—7 of FIG. 5.

FIG. 8 is a bottom plan view in cross-section of the quick release mechanism of FIG. 3 taken along the line 8—8 of FIG. 4.

FIG. 9 is a top plan of a mounting plate, to which a camera is attached, and the adjustable platform of FIG. 2 with the quick release mechanism of FIG. 3 securing the mounting plate to the adjustable platform.

FIG. 10 is a transverse cross-sectional view of the mounting plate of FIG. 9 taken along the line 10—10 of FIG. 9.

FIG. 11 is a transverse cross-sectional view of the mounting plate of FIG. 9 and the adjustable platform of FIG. 2 taken along the line 11—11 of FIG. 9.

DESCRIPTION OF THE PREFERRED EMBODIMENT

Referring to FIG. 1 a camera support system includes a support apparatus 10. The support apparatus 10 includes a support vest 11, a first arm 12 with a first spring mechanism 13, a second arm 14 with a second spring mechanism 15. An operator wears the support vest 11. The first arm 12 is rotatably and pivotably coupled to the support vest 11. The second arm 14 is rotatably and pivotably coupled to the first arm 12. The first and second spring mechanisms 13 and 15 are coupled to the first and second arms 12 and 14, respectively, in order to compensate for the weight to each end of the first and second arms 12 and 14. The post 16 is fixedly coupled to the second arm 14.

Referring to FIG. 2 the camera support system also includes a camera support 20. The camera support 20 includes a tube 21, a three-axis gimbal 22, a video monitor 23, a battery pack 24 and an electronics package 25, a junction box 26 and a clamp ring 27. The three-axis gimbal 22 is fixedly coupled to the post 16 of the support apparatus 10. The electronics package 25 is suitable for operation of a camera and the video monitor 23. The clamp rings 27 secures the junction box 26 to the tube 21.

Referring to FIG. 1 in conjunction with FIG. 2 the camera support system enables a mobile photographer to take high quality, ambulatory hand-held photographs with the camera. The combined mass of the camera support 20 and the camera is distributed at points which are remote from each other about a handle in a manner so that the handle is located at approximately the center of the moment of inertia of the camera support 20 and the camera. The camera support 20 increases inherent stability in a manner which permits a cameraman to obtain high quality results when utilizing hand-held equipment. The support apparatus 10 permits the camera support 20 to float freely in a manner to isolate the camera from any movement of the cameraman.

Referring to FIG. 3 in conjunction with FIG. 4 and FIG. 5 the tube 21 is hollow and upright. The tube 21 terminates upwardly in a mounting disc 28. The mounting disc 28 is affixed to the tube 21 by a screw 29. The camera support 20 also includes an adjustable platform 30 which has a first stage 31, a second stage 32 and a third stage 33. The adjustable platform 30 also has a lateral adjustment mechanism 34 and a longitudinal adjustment mechanism 35. The first stage 31 is fixedly coupled to the mounting disc 28. The lateral adjustment mechanism 34 couples the second stage 32 to first stage 31 so that the second stage 32 bi-directionally moves laterally relative to the first stage 31. The longitudinal adjustment mechanism 35 couples the third stage 33 to the second stage 32 so that the third stage 33 bi-directionally moves longitudinally relative to the second stage 32.

Referring to FIG. 4 in conjunction with FIG. 5 and FIG. 6 the first stage 31 comprises a rectangular plate 36 which has a front, a rear and two sides, a top and a bottom. The first plate 36 also has a first drive block bore 37 of a first diameter and a first rod bore 38 of a second diameter. The first drive block bore 37 extends from the top to the bottom thereof. The first rod bore 38 laterally extends from the front to the rear thereof. The first plate 36 also has a pair of first bearing block seats 39. The first bearing block seats 39 are outwardly and downwardly facing. Each first bearing block seat 39 laterally extends from one side to the other side and is disposed on one of the front and the rear thereof. The lateral adjustment mechanism 34 includes a first drive block 40 of the first diameter with a threaded bore 41 of a third diameter, which is less than the second diameter, and a pair of first linear motion bearing blocks 42. The first drive block 40 is fixedly coupled to the first plate 36 and is disposed in the first drive block bore 37 thereof. Each first linear motion bearing block 42 is fixedly coupled to the first plate 36 and is disposed adjacent to one of the first bearing block seats 39 thereof.

Still referring to FIG. 4 in conjunction with FIG. 5 and FIG. 6 the second stage 32 comprises a second plate 43 which has a front, a rear, two sides, a top and a bottom. The second plate 43 also has a pair of first rod mounts 44 and a pair of first rail seats 45. Each first rod mount 44 is disposed on one of the sides thereof and is oppositely aligned with the other first rod mount 44. The first rail seats 45 are inwardly and downwardly facing. Each first rail seat 45 laterally extends from one side to the other side and is disposed on one of the front and the rear thereof. The lateral adjustment mechanism 34 also includes a pair of first linear motion rails 46, a first threaded rod 47 of the second diameter and a first knurled knob 48. The first knurled knob 48 is fixedly coupled to the first threaded rod 47. Each first linear motion rail 46 is fixedly coupled to the second plate 43 and is disposed adjacent to one of the first rail seats 45 thereof. Each first linear motion rail 43 slidably engages one of the first linear motion bearing blocks 42 so that the second plate 43 bi-directionally moves laterally relative to the first plate 36. The first drive block 40 is stationary relative to the mounting disc 28 and the first stage 31. The first threaded rod 47 is threadedly coupled to the threaded bore 41 of the first drive block 40 so that the first threaded rod 47 bi-directionally moves laterally relative to the first drive block 40 and is slidably coupled to the first rod bore 38 of the first plate 36. The first threaded rod 47 is rotatively coupled to the first rod mounts 44 of the second plate 43 so that the first threaded rod 47 bi-directionally drives the second stage 32 laterally relative to the first stage 31. The second plate 43 further has a second drive block bore 49 of a fourth diameter, which is larger than the first diameter, a second rod bore 50 of the second diameter and a pair of second bearing block seats 51. The second drive block bore 49 extends from the top to the bottom thereof. The second rod bore 50 longitudinally extends from one side to the other side thereof. The second bearing block seats 51 are outwardly and upwardly facing. Each second bearing block seat 51 longitudinally extends from the front to the rear and is disposed on one of the sides thereof. The longitudinal adjustment mechanism 35 includes a second drive block 52 with a second threaded bore 53 of the first diameter and a pair of second linear motion bearing blocks 54. The second drive block 52 is fixedly coupled to the second plate 43 and is disposed in the second drive block bore 49 thereof. Each second linear motion bearing block 54 is fixedly coupled to the second plate 43 and is disposed adjacent to one of the second bearing block seats 51 thereof.

Still futher referring to FIG. 4 in conjunction with FIG. 5 and FIG. 6 the third stage 33 comprises a third plate 55 which has a front, a rear, two sides, a top, a bottom, a pair of second rod mounts 56 and a pair of second rail seats 57. The second rod mounts 56 are inwardly and downwardly facing. Each second rod mount 56 is disposed on one of the front and back thereof and is oppositely aligned with the other second rod mount 56. The second rail seats 57 are inwardly and downwardly facing. Each second rail seat 57 longitudinally extends from the front to the back and is disposed on one of the two sides thereof. The longitudinal adjustment mechanism 35 also includes a pair of second linear motion rails 58, a second threaded rod 59 of the second diameter and a first gear wheel 60. The first gear wheel 60 is fixedly coupled to the second threaded rod 59. The longitudinal adjustment mechanism 35 further includes a drive rod 61, a second gear wheel 62 and a second knurled knob 63. The second gear wheel 62 and the second knurled knob 63 are fixedly coupled to the drive rod 61. The second gear wheel 62 engages the first gear wheel 60. Each second linear motion rail 58 is fixedly coupled to the third plate 55 and is disposed adjacent to one of the second rail seats 57 thereof. Each second linear motion rail 58 slidably engages one of the second linear motion bearing blocks 54 so that the third plate 55 bi-directionally moves longitudinally relative to the second plate 43. The second drive block 52 is stationary relative to the second stage 32. The second threaded rod 59 is threadedly coupled to the threaded bore 53 of the second drive block 52 so that the second threaded rod 59 bi-directionally moves longitudinally relative to the second drive block 52 and is slidably coupled to the second rod bore 50 of the second plate 43. The second threaded rod 59 is rotatively coupled to the second rod mounts 56 of the third plate 55 so that the second threaded rod 59 bi-directionally drives the third stage 33 longitudinally relative to the second stage 32. The third plate 55 also has a first sidewall 64 and a second sidewall 65. The first and second sidewalls 64 and 65 are downwardly and inwardly beveled. The first sidewall 64 is disposed adjacent to the top and longitudinally extends from front to back on one side thereof. The second sidewall 65 is disposed adjacent to the top and intermittingly and longitudinally extends from front to back on the other side thereof.

Referring to FIG. 4 in conjunction with FIG. 6 and FIG. 7 third stage 33 further has a quick release mechanism 70. The quick release mechanism 70 includes a locking plate 71, a cam lever mount 72, a cam lever 73, a mounting screw 74 and a washer 75. The cam lever mount 72 is fixedly coupled to the locking plate 71. The mounting screw 74 and the washer 75 rotatively coupled the cam lever 73 to the cam lever mount 72.

Referring to FIG. 6 in conjunction with FIG. 7 and FIG. 8 the quick release mechanism 70 also includes two pins 76, a locking screw 77, a spring 78 and a screw 79 with a ball-plunger 80 which is resiliently biased. The cam lever 73 has a pair of notches 81. The two pins 76 are fixedly coupled to the third plate 55 and slidably coupled to the locking plate 71. The locking screw 77 is threadedly coupled to the third plate 55 and slidably coupled to the locking plate 71. The spring 78 resiliently couples the locking plate 71 to the third plate 55. The screw 79 is fixedly coupled to the locking plate 71. The ball-plunger 80 of the screw 79 engages one of the notches 81, as shown in FIG. 7 and in phantom lines in FIG. 6, of the cam lever 73 when the cam lever 73 is in its closed position as shown in FIG. 6 in order to provide a stop therefor. When the cam lever 73 is in its open position as shown in phantom lines in FIG. 6 the ball-plunger 80 of the screw 79 engages the other notch 81, as shown in phantom lines in FIG. 6, of the cam lever 73 in order to provide a stop therefor.

Referring to FIG. 9 in conjunction with FIG. 10 a mounting plate 90 has a first sidewall 91 and a second sidewall 92. The first sidewall 91 has a series of stops 93 thereon. The mounting plate 90 also has a mounting surface 94 with a plurality of mounting bores 95 so that the mounting plate 90 can be attached to the base of each of a variety of cameras.

Referring to FIG. 9 in conjunction with FIG. 6 and FIG. 11 the cam lever 73 is moved from its closed position as shown in FIG. 6 to its open position as shown in phantom lines in FIG. 6 in order to open the quick release mechanism 70. When the quick release mechanism 70 is open, the mounting plate 90 and the camera may be placed onto the top of the third plate 55. When the quick release mechanism 70 is closed and the locking screw 77 is loosened, the mounting plate 90 is slidably coupled to the third plate 55. The engagement of the first and second sidewalls 64 and 65 of the first plate 36 to the first and second sidewalls 91 and 92, respectively, of the mounting plate 90 loosely secures the mounting plate 90 to the third plate 55 so that the mounting plate 90 can not be lifted upward away from the third plate 55. Each stop 93 of the first sidewall 91 of the mounting plate 90 engages the first sidewall 64 of the third plate 55 so that the mounting plate 90 can not be slidably, longitudinally moved either from the front to the rear or from the rear to the front in order to stop the mounting plate 90 from being removed. When the locking screw 77 is tightened, the locking plate 71 moves laterally towards the mounting plate 90 so that the locking plate 71 engages the second sidewall 92 of the mounting plate in order to securely couple the mounting plate 90 to the third plate 55. The use of the quick release mechanism 70 results in an easily and quickly produced, yet slidably secure mounting for the mounting plate 90 for the camera. The lateral and longitudinal adjustment mechanisms 34 and 35 operate to readily accommodate variations in cameras, as well as variations in placement of the mounting plate 90 for the base of the camera upon the adjustable platform 30 thus avoiding the need for a particularly careful placement of the mounting plate with the base of the camera mounted thereon thereby simplifying use of the camera support 20. Stabilization of the camera 20 support is accomplished by adjustment of the unit to appropriately position its center of gravity for stabilized operation. This center of gravity is established, outside of the camera, by the expanded, balanced arrangement of the various components including the camera support 20, the adjustable platform 30, the mounting plate 90, the camera and the plurality of auxiliary camera equipment.

From the foregoing it can be seen that a quick release mechanism which secures a mounting plate for a base of a camera to an adjustable platform has been described. The quick release mechanism, when it is open, allows the mounting plate to be mounted to the adjustable platform. When it is closed, the quick release mechanism loosely and slidably secures the mounting plate to the adjustable platform. When the locking screw is tightened, the quick release mechanism fixedly secures the mounting plate to the adjustable platform. It should be noted that the sketches are not drawn to scale and that distance of and between the figures are not to be considered significant.

Accordingly it is intended that the foregoing disclosure and showing made in the drawing shall be considered only as an illustration of the principle of the present invention.

What is claimed is:

1. An adjustable platform for use with a camera, said adjustable platform comprising:
   a. a platform having a surface, a first downwardly innerly beveled sidewall and a second downwardly innerly beveled sidewall;
   b. a mounting plate, which has a first sidewall and a second sidewall and to which the camera is attached, disposed on said platform whereby said first and second downwardly innerly beveled sidewalls loosely engage said first and second sidewalls, respectively, of said mounting plate so that said mounting plate is slidably coupled to said platform;
   c. a locking mechanism which securely engages said mounting plate to said platform; and
   d. a quick release mechanism including:
      i. a locking plate;
      ii. a cam lever mount fixedly coupled to said locking plate;
      iii. a cam lever having a pair of notches;
      iv. a mounting screw and a washer rotatively coupling said cam lever to said cam lever mount;
      v. two pins slidably coupled to said locking plate and fixedly coupled to said platform;
      vi. a spring resiliently coupling said locking plate to said platform;

vii. a screw having a ball-plunger which is resiliently biased and being fixedly coupled to said locking plate whereby said ball-plunger of said screw engages one of said notches of said cam lever to provide a stop therefor; and viii. a locking screw slidably coupled to said locking plate and threadedly coupled to said platform whereby when said locking screw is tightened, said locking plate moves laterally towards said mounting plate so that said locking plate engages the second sidewall of said mounting plate in order to securely couple said mounting plate to said platform.

\* \* \* \* \*